May 16, 1944.  R. S. HARTMAN  2,348,811
TIRE CARRIER
Filed Aug. 20, 1942  3 Sheets-Sheet 1

INVENTOR.
RUSH H. HARTMAN
BY Albert Sperry
ATTORNEY

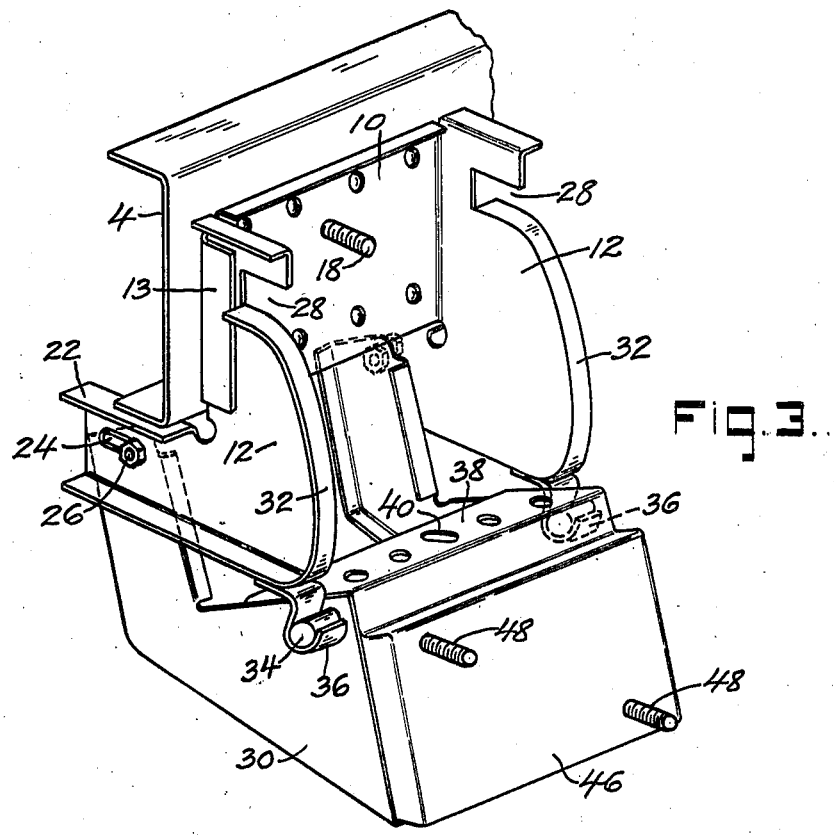
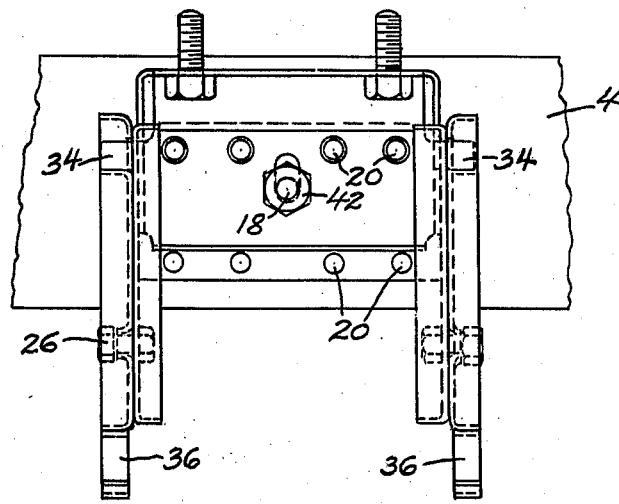

May 16, 1944.　　　R. S. HARTMAN　　　2,348,811
TIRE CARRIER
Filed Aug. 20, 1942　　　3 Sheets-Sheet 3

INVENTOR.
RUSH H. HARTMAN
BY Albert Sperry.
ATTORNEY

Patented May 16, 1944

2,348,811

UNITED STATES PATENT OFFICE 2,348,811

TIRE CARRIER

Rush S. Hartman, Trenton, N. J.

Application August 20, 1942, Serial No. 455,541

11 Claims. (Cl. 224—29)

My invention relates to tire carriers for trucks and other vehicles and is directed particularly to tire carriers of the type in which the tire is supported in a generally horizontal position above the chassis frame.

Tire carriers of this type as heretofore produced have generally embodied a complicated construction requiring locking catches or other means to prevent the tire and wheel from falling when unlocked. The operator is then required to support the tire when releasing the catch to prevent great strain on the carrier and avoid the danger of the operator being struck by the falling tire on release of the catch. These carriers, due to their complicated construction generally have embodied one or more relatively heavy and expensive castings, forgings or machined parts. Moreover, they have frequently been constructed so that they require considerable clearance between the frame and truck body to permit a tire mounted on the carrier to be moved to a pivotal manner about the frame into and out of carrying position.

In accordance with my invention these objections to constructions of the prior art are overcome and a tire-carrier is provided which embodies elements capable of being formed of simple metal stampings and so constructed that the parts have relative sliding and pivotal movements which require very limited clearance between the frame and truck body for moving the tire into and out of its carrying position. A further important feature of my invention resides in combinations of elements which serve to support the tire in its carrying position after it is unlocked or released and until it is positively moved to lower the tire and wheel.

It is usual practice today to carry a spare tire in a mounted and inflated condition on a wheel and rim and such assemblies are generally referred to as a "spare tire" or simply a "tire." In describing the present invention and in the claims I have used the term "tire" in this sense to refer to a tire and wheel or tire and rim assembly, except when otherwise specifically indicated.

One of the objects of my invention is to provide a tire carrier which is simple and economical in construction and in which the main elements are capable of being formed entirely from metal stampings.

Another object of my invention is to provide a tire carrier including elements capable of combined sliding and pivotal movement in moving a tire into and out of its carrying position.

A further object of my invention is to provide a tire carrier in which the tire and wheel on which it is mounted are held in a substantially horizontal position after release or unlocking of the carrier and until positively moved to lowered tire receiving position.

These and other objects and features of my invention will appear from the following description thereof in which reference is made to the figures of the accompanying drawings.

In the drawings:

Fig. 3 is a perspective of the construction shown in Fig. 1.

Fig. 4 is a front elevation of the construction of Fig. 1, and

Figure 1:
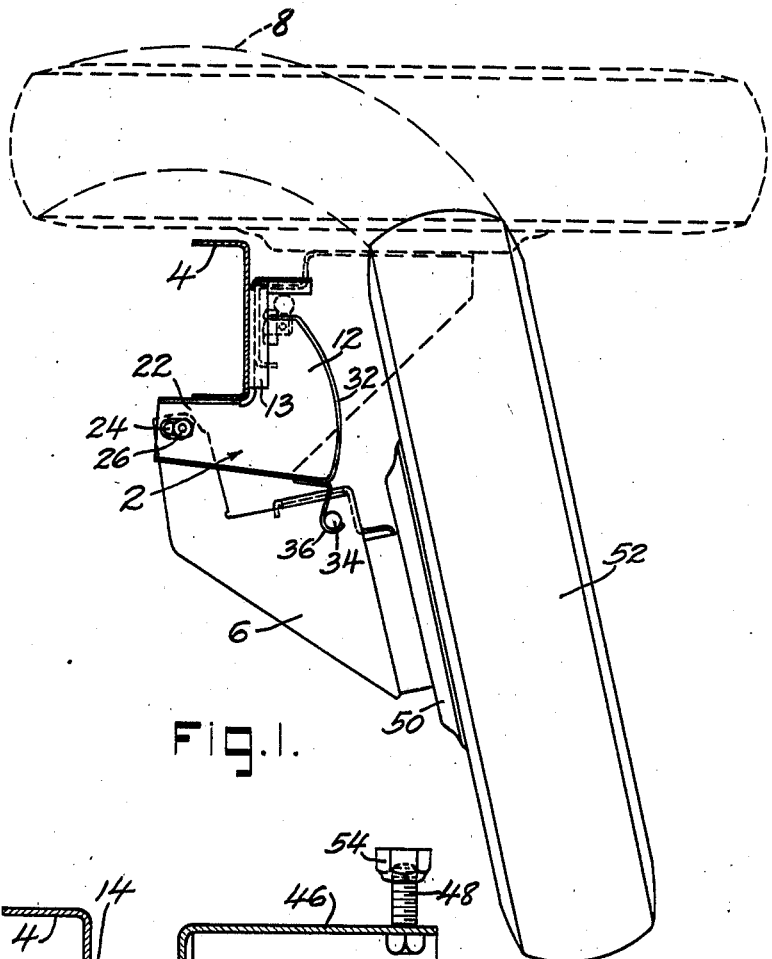
Fig. 1 is a side elevation of a typical tire carrier embodying my invention with the tire in lowered position.
Figure 2:
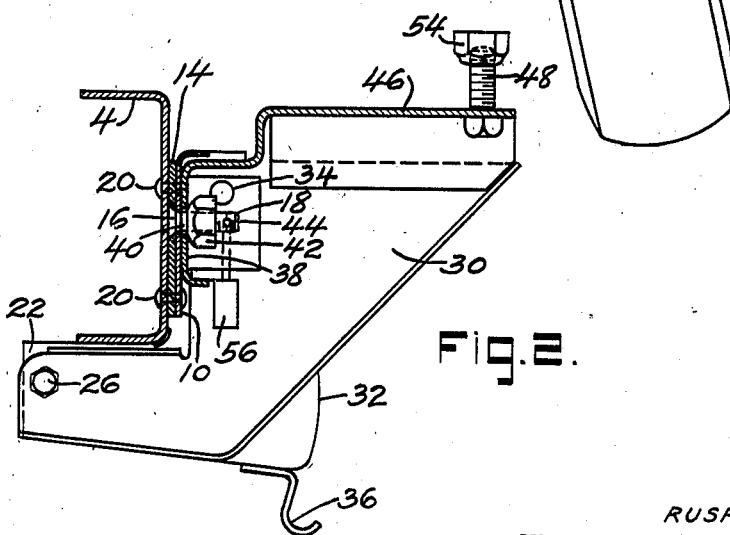
Fig. 2 is a vertical sectional view of the tire carrier of Fig. 1 with the parts in the carrying position.

In the preferred form of my invention shown in Figs. 1 to 5 of the drawings, the tie carrier comprises two main elements which may be formed of metal stampings. The attaching element 2 of the carrier is adapted to be secured to the chassis frame 4 of a truck, bus, trailer, or other vehicle, whereas the tire carrying member 6 of the carrier is slidably and pivotally connected to the attaching element in such a manner that it may be moved from a raised, tire carrying position in which the tire is supported in a generally horizontal position above the chassis frame, as shown in dotted lines in Fig. 1, to a lowered tire receiving position, as shown in full lines in Fig. 1. The path of movement of the upper portion of the tire is shown by the dotted lines 8 and it will be noted that very little clearance between the frame and truck body is required for movement of the tire into and out of its carrying position.

The attaching element 2 of the carrier is a unitary member which includes side plates 12 connected by the back plate 10, adapted to be located adjacent the chassis frame. A reinforcing plate 14 is located between the chassis frame and the back plate 10 and welded to the back plate. The side portions 13 of the reinforcing plate are also welded to the side plates 12 of the attaching element. The reinforcing plate not only strengthens the back plate 10 and side plates 12 of the attaching element but also provides anchorage for the head 16 of the retaining stud 18. Rivets 20 extend through the chassis frame 4, reinforcing plate 14 and the back plate 10 for securing the attaching element in place on the chassis frame. It is to be understood that by the use of heavier gauge metal the attaching element may be made in a single piece, eliminating the reinforcing plate 14 and it will be apparent that the attaching element may be secured to the chassis frame by any other preferred means or in any suitable manner.

The side plates 12 of the attaching element project outward from the back plate and chassis frame substantially at right angles to the back plate 10 and have parts 22 which extend downwardly and inwardly beneath the chassis frame. The parts 22 are formed with closed horizontal slots 24 for receiving short hinge bolts 26 or other pivot means carried by or located on the side plates 30 of the tire carrying member 6. The upper portion of each side plate 12 of the attaching element is formed with an open horizontal slot 28 which extends inward from the curved edge 32 of the side plate to receive laterally projecting pins 34 welded onto the side plates 30 of the tire carrying member.

With this construction the connection between the attaching element and tire carrying member provides for combined horizontal sliding and vertical pivotal movement of the tire carrying member relative to the attaching element. At the same time the pins 34 on the tire carrying member are arranged to enter the slots 28 in the side plates of the attaching element to hold the tire carrying member and tire in their raised position until they are positively moved to withdraw the pins 34 from the slots 28. The curved edges 32 of the side plates 12 of the attaching element are engaged by the pins 34 as the tire carrying member is lowered and stop means 36 are located at the lower extremities of the edges 32 to hold the tire in a lowered position in which it just clears the ground.

The tire carrying member 6 may also be formed as a metal stamping and has a back plate 38 with an opening 40 therein through which the retaining stud 18 projects to receive a nut 42 for positively holding the tire carrying member in elevated position during travel or during operation of the truck or vehicle to which the carrier is applied. The outer end of bolt 18 is formed with an opening 44 for receiving a padlock or other means for preventing theft of a tire secured to the tire carrying member. It will be obvious that the tire cannot be removed from the tire carrying member without lowering this member since there is not sufficient clearance between the body of the truck and the tire to permit its removal from the tire carrying member when in its raised position.

The tire carrying member 6 not only has the back plate 38 and the side plates 30, but also is formed with a top plate 46 which serves as a tire supporting means. The top plate extends outwardly from the back plate and when in raised position it is located so as to hold the tire in a generally horizontal position just above the upper edge of chassis frame 4. Bolts 48 are fixedly secured to the top plate and project upward therefrom to pass through openings in the wheel 50 on which the tire 52 is mounted. The bolts 48 are threaded to receive attaching nuts 54 for holding the tire and wheel in place on the tire carrying member.

In using the tire carrier shown in Figs. 1 to 5 the tire carrying member 6 is moved to its lowered, full line position of Fig. 1 in which the short bolts 26 which serve as pivot means for the tire carrying member are located at the outer or right hand end of the slots 28 in the attaching member as seen in Fig. 1. The tire is mounted on the top plate 46 of the tire carrying member by placing the wheel 50 against the top plate with the bolts 48 projecting through holes in the wheel. The nuts 54 are applied to the bolts 48 and the tire is then raised to a horizontal position by vertical pivotal movement about the short bolts 26.

In raising the tire and tire carrying member the pins 34 travel along the rounded edges 32 of the attaching element until they are brought into positions opposite the open ends of the slots 28 in the side plates and the retaining bolt 18 is brought into position opposite the opening 40 in the back plate 38 of the tire carrying member. The tire and tire carrying member are then moved horizontally inward relative to the chassis frame so as to be supported in place by the laterally projecting pins 34 resting in the slots 28. At the same time the retaining bolt 18 is projected through the front face of the back plate 38 of the tire carrying member to receive the nut 42. The pivot bolts 26 on the tire carrying members are moved horizontally to the inner ends of the closed slots 24 as the tire and tire carrying member are moved inwardly relative to the chassis frame. In this way the tire is freely held in its raised tire carrying position so that the nut 42 may be applied to the retaining bolt 18 and a padlock 56 may be passed through the opening 44 in the bolt to prevent theft of the tire.

When it is desired to remove the tire from the carrier the padlock 56 and nut 42 are removed from the retaining bolt 18. The carrier and tire are still held in raised, tire carrying position by the laterally projecting pins 34 on the tire carrying member which remain in the open ended slots 28 in the attaching element. However, the tire and tire carrying member may be readily pulled horizontally outward to move the short pivot bolts 26 to the outer extremity of the closed slots 24 in the lower parts 22 of the attaching element and to withdraw the laterally projecting pins 34 of the tire carrying member from the open ended slots 28 in the upper part of the attaching element. The tire may then be lowered to the full line position in which it is held free of the ground by the stop means 36.

Figure 5:
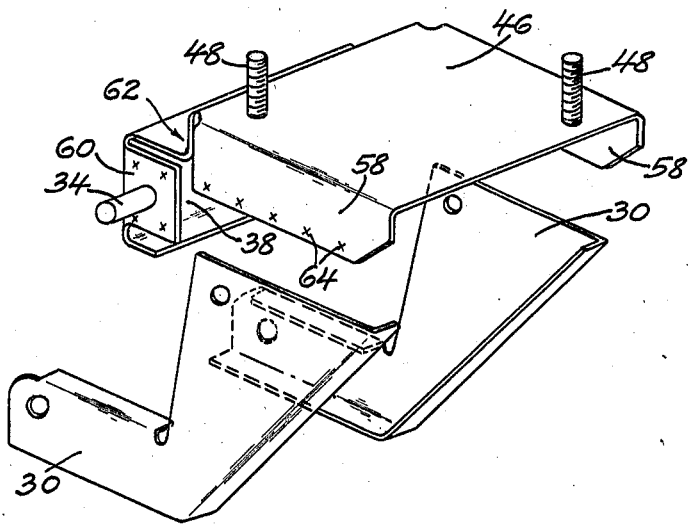
Fig. 5 is a perspective of parts of the tire carrying member shown in Fig. 1 arranged for welding into a unit.

Different sizes and styles of wheels are formed with openings in different locations and some wheels are dished or otherwise formed and in some instances the tire and rim only, without the wheel, are mounted on the carrier. It is therefore desirable in some instances to form the top plate and its bolts as a separate element as shown in Fig. 5. The side plates 60 of the tire carrying member can then be made in a standard size and a top plate 46 of the desired form with side flanges 58 and pin carrying flanges 60 as well as the offset angle 62 to position the plate 36 as desired for any particular installation. The flanges 58 can then be welded to the side plates 30 as shown at 54 or they can be riveted or otherwise secured to the side plates so as to be substantially integral therewith.

Figure 6:
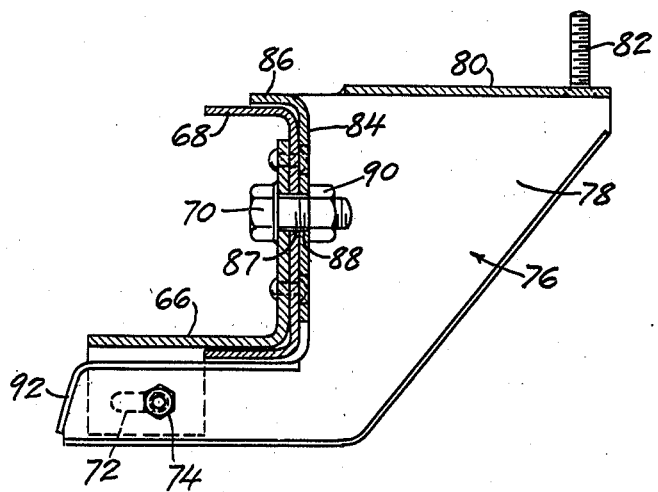
Fig. 6 is a vertical sectional view illustrating a typical alternative embodiment of my invention.

While I have shown one preferred form of carrier embodying my invention in Figs. 1 to 5, numerous alternative embodiments thereof are possible and I have shown one such alternative construction in Fig. 6. In this device attaching element 66 of the carrier is formed of a metal stamping and is secured by rivets or otherwise to the inner face of the chassis frame 68. The locking bolt 70 has its inner head welded to the element 66. The lower portion of the element 66 is formed with an elongated slot 72 which receives a pivot bolt 74 carried by the tire carrying member 76. The tire carrying member may be formed as a metal stamping and has side plates 78 which carry the pivot bolts 74 and a top plate 80 which carries the tire retaining bolts 82. The back plate 84 of the tire carrying member is formed with a flange 86 which is positioned to extend inwardly over the upper edges of the chassis frame so as to hold the tire carrying member in raised position. The locking bolt 70 projects through a hole 87 in the chassis frame 68 and through the opening 88 in the tire carrying member and receives a nut 90 for securing the tire carrying member in its raised position. When the nut 90 is removed the flange 86 still holds the tire carrying member in raised position, whereas when pulled outward or to the right as shown in Fig. 6, the tire can be swung downward until the tail portion 92 swings upward and engages the element 66 to serve as a stop for holding the carrier in a lowered tire receiving position. In raising the tire and tire carrying member the flange 86 engages the chassis frame and rides up the outer surface thereof until it may be pushed horizontally inward to hold the tire in raised position.

It will be apparent that in each of the forms of my invention described the movement of the tire to its lowered position is effected positively by the operator and the tire cannot fall freely or unintentionally simply by release or unlocking of the tire carrying member. Moreover all of the parts of the carrier except the bolts may be made of simple metal stampings which are economical and easy to produce.

Although I have shown and described typical alternative constructions embodying my invention, numerous other froms and arrangements of the elements and parts employed may be used and the various elements and members may be formed integral or as separate parts, if desired, without departing from the spirit of my invention. In view thereof it should be understood that the forms of my invention herein described and shown in the figures of the drawings are intended to be illustrative only and are not intended to limit the scope of the following claims.

What I claim is:

1. A tire carrier comprising an attaching element adapted to be secured to the chassis frame of a truck or the like and having a lower connecting portion and an upper holding portion, a tire carrying member having tire supporting means thereon located so as to support the tire in a generally horizontal position above the chassis frame when said member is in a raised tire carrying position, said tire carrying member having a part extending downward from the tire supporting means and cooperating with the lower connecting portion of said attaching element to provide a sliding and pivotal connection therebetween, whereby said tire carrying member may be slidably moved inward and outward relative to said frame and pivotally moved about said frame into and out of said raised, tire carrying position, said member also having means thereon engageable with the upper supporting portion of the attaching element to hold said member in a raised, tire carrying position when said member is raised and moved inward relative to said frame, and to disengage said supporting portion when said member is moved outward relative to said frame.

2. A tire carrier comprising an attaching element adapted to be secured to the chassis frame of a truck or the like, said element having an upper part which projects outwardly from the outer face of the frame near the upper portion of said frame and having a lower part which projects inwardly from the outer face of the frame near the lower portion of said frame, a tire carrying member having tire supporting means thereon located approximately even with the upper edge of the chassis frame when said member is in a raised, tire carrying position whereby a tire supported by said means will be held in a generally horizontal position above said frame, said member having a portion thereof engageable with the upper outwardly projecting part of said element to hold said member in said raised, tire carrying position and having another portion thereof cooperating with the lower inwardly extending part of said element to provide a sliding and pivotal connection therebetween, whereby the tire carrying member may be slidably moved relative to said element and frame to disengage the outwardly projecting part of the attaching element and may then be pivotally moved to a lowered tire receiving position.

3. A tire carrier comprising an attaching element adapted to be secured to the chassis frame of a truck or the like, and having a portion extending inwardly from said frame below the lower face thereof, a tire carrying member having tire supporting means located so as to support the tire in a generally horizontal position above the chassis frame when said member is in a raised, tire carrying position, said member having a portion extending inward beneath the chassis frame adjacent the corresponding portion of the attaching element, said portions being provided with cooperating parts constituting a sliding and pivotal connection therebetween whereby the tire carrying member is slidable relative to said frame and capable of being swung downward from said raised, tire carrying position to a lowered tire receiving position, and means on said element and member for holding the tire carrying element in raised, tire carrying position, said means being movable into and out of engagement by relative sliding movement of said member and element.

4. A tire carrier comprising an attaching element adapted to be secured to the chassis frame of a truck or the like and having a portion located inwardly from the outer face of the frame and adjacent the lower part of the frame, said portion of the attaching element being formed with a horizontal slot therein, a tire carrying member provided with tire supporting means located adjacent the upper portion of the chassis frame so as to support the tire in a generally horizontal position above the chassis frame when said member is in a raised, tire carrying position, and having a part extending downward from the tire supporting means and provided with pivot means thereon extending into the slot in said portion of the attaching element to provide a sliding and pivotal connection between the member and element whereby the tire carrying member may be moved horizontally and pivotally relative to the chassis frame to move the member into and out of said raised tire carrying position in which the tire is positioned above the chassis frame, and means carried by said member and element and engageable only when said tire carrying member is in its raised position and at one limit of its horizontal movement for holding said member on said raised, tire carrying position.

5. A tire carrier adapted to be secured to the chassis frame of a truck or the like comprising an attaching element in the form of a metal stamping shaped to engage the chassis frame and having a part which extends inwardly beneath the frame, a tire carrying member having tire supporting means thereon located so as to support the tire in a generally horizontal position above the chassis frame when said member is in a raised tire carrying position, said member having a holding portion thereof engageable with said stamping to hold the tire carrying member in said raised, tire carrying position, and also having a part engagable with that part of the attaching element which extends inwardly beneath the chassis frame, said parts of the attaching element and tire carrying member being formed with a pin and slot connection to permit relative sliding and pivotal movement of the tire carrying member whereby the holding portion of the tire carrying member may be disengaged from the attaching element upon relative sliding movement of said member and element.

6. A tire carrier comprising an attaching element adapted to be secured to the chassis frame of a truck or the like and formed with horizontal slots therein adjacent the lower part of the chassis frame, a tire carrying member in the form of a metal stamping having a back plate, side plates and a top plate, said side plates being formed with pivot means extending into said slots in the attaching element to permit both sliding and pivotal movement of the member relative to said element and frame, said back plate having means thereon slidably movable with the tire carrying member into and out of engagement with means on the element to hold the tire carrying member in a raised tire supporting position, and said top plate having means thereon for receiving and holding a tire and located to support a tire in a generally horizontal position above the chassis frame when the member is in a raised, tire carrying position.

7. A tire carrier comprising an attaching element in the form of a metal stamping having a back plate adapted to be secured adjacent a vertical face of the chassis frame of a truck or the like and having a portion extending downward from the back plate and formed with a horizontal slot therein, and a tire carrying member having means thereon cooperating with the downwardly extending portion of the metal stamping to provide a sliding and pivotal connection therebetween whereby the tire carrying element may be moved outward relative to said frame and stamping and swung downward from a raised, tire carrying position to a lowered tire receiving position, and means movable with said tire carrying member toward and away from the chassis frame and into and out of position to hold the tire carrying member in raised, tire carrying position.

8. A tire carrier comprising an attaching element in the form of a metal stamping having a back plate adapted to be secured adjacent a verttical outer face of the chassis frame of a truck or the like and having side plates extending outward and downward from the frame substantially at right angles to the back plate, the lower part of said side plates each being provided with portions extending inwardly beneath said frame, and a tire carrying member having means thereon cooperating with the inwardly extending portion of the metal stamping to provide a sliding and pivotal connection therebetween whereby the tire carrying element may be moved outward relative to said frame and stamping and swung downward from a raised, tire carrying position to a lowered tire receiving position, and means movable with said tire carrying member in sliding movement thereof to hold the tire carrying member in raised, tire carrying position.

9. A tire carrier comprising an attaching element in the form of a metal stamping having a back plate adapted to be secured adjacent a vertical outer face of the chassis frame of a truck or the like and having side plates extending outwardly and downwardly from the frame substantially at right angles to the back plate, the lower parts of said side plates each being provided with portions extending inwardly beneath said frame, and having horizontal slots therein, and a tire carrying member having tire supporting means thereon located so as to support a tire in a generally horizontal position above the chassis frame when said member is in a raised, tire carrying position, said member also having parts extending into said slots in the attaching element to provide a sliding and pivotal connection therebetween whereby the tire carrying member may be moved outward relative to said frame and swung downward from said raised, tire carrying position to a lowered tire receiving position, and means movable with said tire carrying member on sliding movement thereof to engage a portion of the attaching element for holding the tire carrying member in raised, tire carrying position.

10. A tire carrier adapted to be secured to the chassis frame of a truck or the like comprising an attaching element in the form of a metal stamping including a plate shaped to engage the chassis frame and having a part which extends downwardly from said plate and inwardly from the frame and formed with a horizontal slot therein, and a tire carrying member also formed as a metal stamping and including a back plate, side plates and a top plate, said side plates being formed with pivot means thereon extending into the horiznotal slot in the attaching element to permit both sliding and pivotal movement of said member relative to said element, said back plate having means thereon operative on movement of the tire carrying member toward the chassis frame to hold said member in a raised, tire carrying position, and said top plate being positioned substantially even with the upper edge of the chassis frame when said member is held in said raised, tire carrying position whereby a tire supported by the top plate will be held in a generally horizontal position above the chassis frame.

11. A tire carrier comprising an attaching element in the form of a metal stamping having a back plate adapted to be secured to the outer face of the chassis frame of a truck or the like and having spaced parallel side plates the upper portions of which are each formed with a horizontal slot extending inward from the edge thereof and the lower portions of which are each formed with a closed horizontal slot therein, a tire carrying member also formed as a metal stamping and including a back plate, a top plate and spaced parallel side plates, said top plate being located approximately even with the upper edge of the chassis frame when the tire carrying member is in a raised, tire-carrying position whereby a tire supported on the top plate will be held in a generally horizontal position above the chassis frame, the side plates of the tire carrying member having upper laterally extending parts movable into the open horizontal slots in the attaching element to loosely retain the tire carrying member in said raised tire carrying position and the lower portion of each side plate having pivot means extending into the closed slots in the side plates of said attaching member to provide a slidable and pivotal connection between the member and element.

RUSH S. HARTMAN.